(12) United States Patent
Hattori et al.

(10) Patent No.: US 7,618,691 B2
(45) Date of Patent: Nov. 17, 2009

(54) LIQUID CRYSTAL COMPOSITION AND LIQUID CRYSTAL DISPLAY DEVICE

(75) Inventors: Norikatsu Hattori, Chiba (JP); Mayumi Goto, Chiba (JP); Junichi Yamashita, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 12/210,040

(22) Filed: Sep. 12, 2008

(65) Prior Publication Data

US 2009/0065740 A1 Mar. 12, 2009

(30) Foreign Application Priority Data

Sep. 12, 2007 (JP) ............................... 2007-237151
Apr. 10, 2008 (JP) ............................... 2008-102509

(51) Int. Cl.
*C09K 19/30* (2006.01)
*C09K 19/12* (2006.01)
(52) U.S. Cl. ................ 428/1.1; 252/299.63; 252/299.66
(58) Field of Classification Search .................. 428/1.1; 252/299.63, 299.66
See application file for complete search history.

(56) References Cited

FOREIGN PATENT DOCUMENTS

JP        10-237004    9/1998
JP        2007-002132  1/2007

*Primary Examiner*—Shean C Wu
(74) *Attorney, Agent, or Firm*—Hogan & Hartson LLP

(57) ABSTRACT

A liquid crystal composition having a negative dielectric anisotropy that includes two components, wherein the first component is at least one compound selected from the group of compounds represented by formulas (1-1) and (1-2), and the second component is at least one compound selected from the group of compounds represented by formulas (2-1) to (2-3):

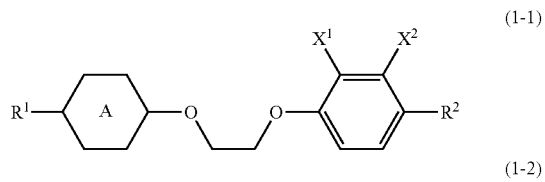

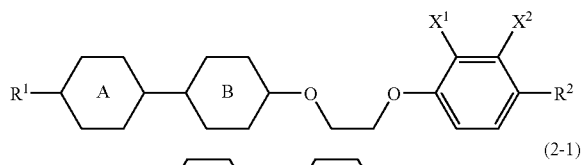

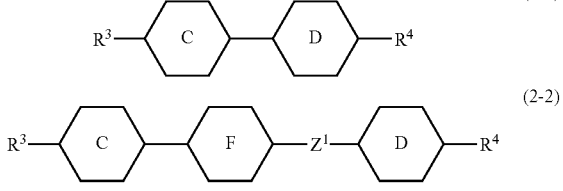

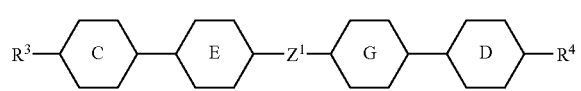

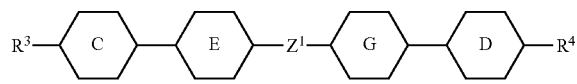

wherein, for example, $R^1$, $R^2$, $R^3$ and $R^4$ are each alkyl having 1 to 12 carbons; $X^1$ and $X^2$ are each fluorine; ring A, ring B, ring C, ring D, ring E, ring F and ring G are each 1,4-cyclohexylene or 1,4-phenylene; and $Z^1$ is a single bond.

16 Claims, No Drawings

LIQUID CRYSTAL COMPOSITION AND LIQUID CRYSTAL DISPLAY DEVICE

CROSS REFERENCE TO RELATED APPLICATIONS

This application claims priority under 35 U.S.C. §119 to Japanese Patent Application No. JP 2007-237151, filed Sep. 12, 2007 and Japanese Patent Application No. JP 2008-102509, filed Apr. 10, 2008, which is expressly incorporated herein by reference in its entirety.

BACKGROUND OF THE INVENTION

1. Field of the Invention

The invention relates to a liquid crystal composition suitable for use in an active matrix (AM) device, and an AM device containing the composition. More specifically, the invention relates to a liquid crystal composition having a negative dielectric anisotropy, and also relates to a device of an in-plane switching (IPS) mode, a vertical alignment (VA) mode or a polymer sustained alignment (PSA) mode, containing the composition.

2. Related Art

In a liquid crystal display device, classification based on an operating mode of liquid crystals includes phase change (PC), twisted nematic (TN), super twisted nematic (STN), electrically controlled birefringence (ECB), optically compensated bend (OCB), in-plane switching (IPS), vertical alignment (VA), a polymer sustained alignment (PSA) mode and so forth. Classification based on a driving mode of the device includes a passive matrix (PM) and an active matrix (AM). PM is further classified into static, multiplex and so forth, and AM is classified into a thin film transistor (TFT), a metal insulator metal (MIM) and so forth. TFT is further classified into amorphous silicon and polycrystal silicon. The latter is classified into a high temperature type and a low temperature type according to a production process. Classification based on a light source includes a reflection type utilizing a natural light, a transmission type utilizing a backlight and a semi-transmission type utilizing both the natural light and the backlight.

These devices contain a liquid crystal composition having suitable characteristics. The liquid crystal composition has a nematic phase. General characteristics of the composition should be improved to obtain an AM device having good general characteristics. Table 1 below summarizes a relationship between the general characteristics of the two. The general characteristics of the composition will be explained further based on a commercially available AM device. A temperature range of a nematic phase relates to the temperature range in which the device can be used. A desirable maximum temperature of the nematic phase is approximately 70° C. or more and a desirable minimum temperature thereof is approximately −10° C. or less. The viscosity of the composition relates to the response time of the device. A short response time is desirable for displaying a moving image with the device. Accordingly, a small viscosity of the composition is desirable. A small viscosity at a low temperature is more desirable.

TABLE 1

General Characteristics of Liquid Crystal Composition and AM Device

| No | General Characteristics of a Composition | General Characteristics of an AM Device |
|---|---|---|
| 1 | Temperature range of a nematic phase is wide | Usable temperature range is wide |
| 2 | Viscosity is small[1) | Response time is short |
| 3 | Optical anisotropy is suitable | Contrast ratio is large |
| 4 | Dielectric anisotropy is positively or negatively large | Threshold voltage is low, electric power consumption is small and contrast ratio is large |
| 5 | Specific resistance is large | Voltage holding ratio is large and a contrast ratio is large |
| 6 | It is stable to ultraviolet light and heat | Service life is long |

[1)A liquid crystal composition can be injected into a cell in a short time.

The optical anisotropy of the composition relates to the contrast ratio of the device. A product (Δn·d) of the optical anisotropy (Δn) of the composition and the cell gap (d) of the device is designed to maximize the contrast ratio. A suitable value of the product depends on the kind of operation mode. In a device having a VA mode, a suitable value is in a range of from approximately 0.30 to approximately 0.40 μm, and in a device having an IPS mode, a suitable value is in a range of from approximately 0.20 approximately to 0.30 μm. In this case, a composition having a large optical anisotropy is desirable for a device having a small cell gap. A large dielectric anisotropy of the composition contributes to a low threshold voltage, a small electric power consumption and a large contrast ratio. Accordingly, a large dielectric anisotropy is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a high temperature after it has been used for a long time. A stability of the composition to an ultraviolet light and heat relates to a service life of the liquid crystal display device. In the case where the stability is high, the device has a long service life. These characteristics are desirable for an AM device used in a liquid crystal projector, a liquid crystal television and so forth.

In an AM device having a TN mode, a composition having a positive dielectric anisotropy is used. In an AM device having a VA mode, a composition having a negative dielectric anisotropy is used. In an AM device having an IPS mode, a composition having a positive or negative dielectric anisotropy is used. In an AM device having a PSA mode, a composition having a positive or negative dielectric anisotropy is used. A liquid crystal composition having a negative dielectric anisotropy is disclosed in the following document.

Conventional compositions are disclosed in JP H10-237004 A/1998 and JP 2007-002132 A/2007.

A desirable AM device is characterized as having a usable temperature range that is wide, a response time that is short, a contrast ratio that is large, a threshold voltage that is low, a voltage holding ratio that is large, a service life that is long, and so forth. Even one millisecond shorter response time is desirable. Thus, the composition having characteristics such as a high maximum temperature of a nematic phase, a low minimum temperature of a nematic phase, a small viscosity, a large optical anisotropy, a large dielectric anisotropy, a large specific resistance, a high stability to an ultraviolet light, a high stability to heat, and so forth is especially desirable.

SUMMARY OF THE INVENTION

The invention concerns a liquid crystal composition having a negative dielectric anisotropy that includes two components, wherein the first component is at least one compound selected from the group of compounds represented by formulas (1-1) and (1-2), and the second component is at least one compound selected from the group of compounds represented by formulas (2-1) to (2-3):

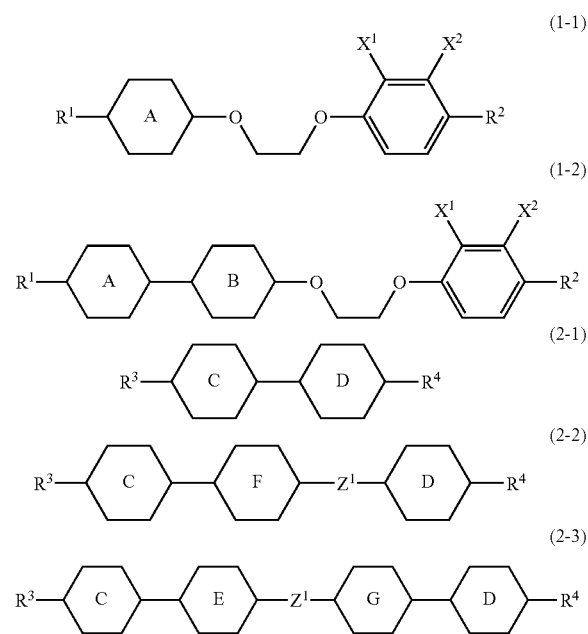

wherein $R^1$ and $R^2$ are each independently alkyl having 1 to 12 carbons, alkoxy having 1 to 12 carbons or alkenyl having 2 to 12 carbons; $R^3$ and $R^4$ are each independently alkyl having 1 to 12 carbons or alkenyl having 2 to 12 carbons, provided that in the alkyl and the alkenyl, arbitrary hydrogen may be replaced by fluorine, and arbitrary —$CH_2$— may be replaced by —O—; $X^1$ and $X^2$ are each independently fluorine or chlorine; ring A, ring B, ring C and ring D are each independently 1,4-cyclohexylene or 1,4-phenylene; ring E and ring G are each independently 1,4-cyclohexylene, 1,4-phenylene, 2-fluoro-1,4-phenylene or 3-fluoro-1,4-phenylene; ring F is 1,4-cyclohexylene, 1,4-phenylene, 2-fluoro-1,4-phenylene, 3-fluoro-1,4-phenylene or 2,5-difluoro-1,4-phenylene; and $Z^1$ is a single bond or carbonyloxy.

The invention also concerns a liquid crystal display device that includes the liquid crystal composition, and so forth.

DETAILED DESCRIPTION OF THE INVENTION

The terms used in the specification and claims are defined as follows. The liquid crystal composition and/or the liquid crystal display device of the invention may occasionally be expressed simply as "the composition" or "the device," respectively. A liquid crystal display device is a generic term for a liquid crystal display panel and a liquid crystal display module. The "liquid crystal compound" is a generic term for a compound having a liquid crystal phase such as a nematic phase, a smectic phase and so forth, and also for a compound having no liquid crystal phase but being useful as a component of a composition. The useful compound contains, for example, a 6-membered ring such as 1,4-cyclohexylene and 1,4-phenylene, and a rod like molecular structure. An optically active compound or a polymerizable compound may occasionally be added to the composition. Even in the case where the compound is a liquid crystal compound, the compound is classified into an additive. At least one compound selected from a group of compounds represented by formula (1) may be abbreviated to "the compound (1)." The "compound (1)" means one compound or two or more compounds represented by formula (1). The other formulas are applied with the same rules. The term "arbitrary" means that not only the position but also the number are arbitrary, but the case where the number is zero is not included.

A higher limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance at room temperature and also at a high temperature in the initial stage, the composition has a large specific resistance at room temperature and also at a high temperature even after it has been used for a long time. "A voltage holding ratio is large" means that a device has a large voltage holding ratio at room temperature and also at a high temperature in the initial stage, the device has a large voltage holding ratio at room temperature and also at a high temperature even after it has been used for a long time. In the description of the characteristics such as optical anisotropy, the characteristics of the composition such as the optical anisotropy and so forth are values measured in the methods disclosed in Examples. The first component includes one compound or two or more compounds. "A ratio of the first component" means the percentage by weight (% by weight) of the first component based on the total weight of liquid crystal composition. A ratio of the second component and so forth are applied with the same rule. A ratio of an additive mixed with the composition means the percentage by weight (% by weight) based on the total weight of liquid crystal composition.

In the chemical formulas of the component compounds, symbol $R^1$ is used in plural compounds. In these compounds, plural $R^1$ may be the same as or different from each other. In one case, for example, $R^1$ of the compound (1) is ethyl and $R^1$ of the compound (2) is ethyl. In another case, $R^1$ of the compound (1) is ethyl and $R^1$ of the compound (2) is propyl. This rule is also applicable to the symbols $R^2$, $R^3$ and so forth.

One of the advantages of the invention is to provide a liquid crystal composition that satisfies many characteristics among the characteristics such as a high maximum temperature of a nematic phase, a low minimum temperature of a nematic phase, a small viscosity, a large optical anisotropy, a large negative dielectric anisotropy, a large specific resistance, a high stability to ultraviolet light and a high stability to heat. Another of the advantages of the invention is to provide a liquid crystal composition that is properly balanced regarding many characteristics. Another of the advantages of the invention is to provide a liquid crystal display device that contains the liquid crystal composition. One aspect of the invention is to provide a liquid crystal composition that has a large optical anisotropy, a large negative dielectric anisotropy, a high stability to ultraviolet light and so forth, and is to provide an AM device that has a short response time, a large voltage holding ratio, a large contrast ratio, a long service life and so forth.

The Invention has the Following Features.

1. A liquid crystal composition having a negative dielectric anisotropy comprising two components, wherein the first component is at least one compound selected from the group of compounds represented by formulas (1-1) and (1-2), and the second component is at least one compound selected from the group of compounds represented by formulas (2-1) to (2-3):

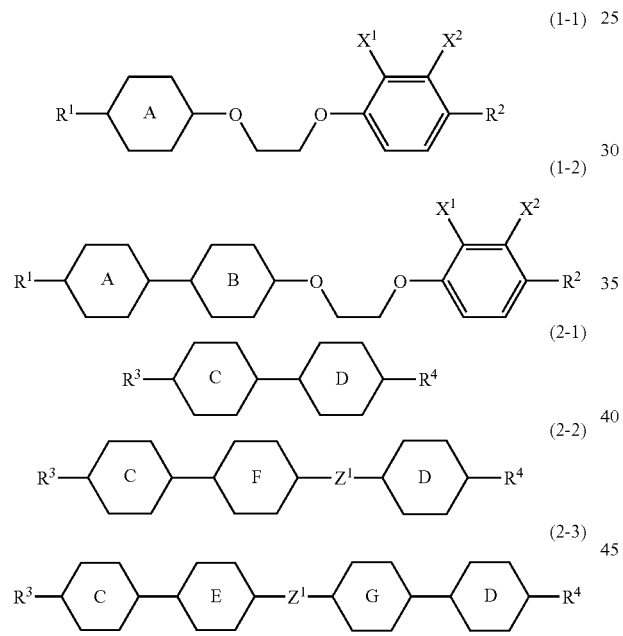

wherein $R^1$ and $R^2$ are each independently alkyl having 1 to 12 carbons, alkoxy having 1 to 12 carbons or alkenyl having 2 to 12 carbons; $R^3$ and $R^4$ are each independently alkyl having 1 to 12 carbons or alkenyl having 2 to 12 carbons, provided that in the alkyl and the alkenyl, arbitrary hydrogen may be replaced by fluorine, and arbitrary —CH$_2$— may be replaced by —O—; $X^1$ and $X^2$ are each independently fluorine or chlorine; ring A, ring B, ring C and ring D are each independently 1,4-cyclohexylene or 1,4-phenylene; ring E and ring G are each independently 1,4-cyclohexylene, 1,4-phenylene, 2-fluoro-1,4-phenylene or 3-fluoro-1,4-phenylene; ring F is 1,4-cyclohexylene, 1,4-phenylene, 2-fluoro-1,4-phenylene, 3-fluoro-1,4-phenylene or 2,5-difluoro-1,4-phenylene; and $Z^1$ is a single bond or carbonyloxy.

2. The liquid crystal composition according to item 1, wherein the first component is a mixture of at least one compound selected from the group of compounds represented by formula (1-1) and at least one compound selected from the group of compounds represented by formula (1-2), and the second component is at least one compound selected from the group of compounds represented by formula (2-1).

3. The liquid crystal composition according to item 1, wherein the second component is a mixture of at least one compound selected from the group of compounds represented by formula (2-1) and at least one compound selected from the group of compounds represented by formula (2-2).

4. The liquid crystal composition according to item 1, wherein the second component is a mixture of at least one compound selected from the group of compounds represented by formula (2-1) and at least one compound selected from the group of compounds represented by formula (2-3).

5. The liquid crystal composition according to item 1, wherein the second component is a mixture of at least one compound selected from the group of compounds represented by formula (2-2) and at least one compound selected from the group of compounds represented by formula (2-3).

6. The liquid crystal composition according to any one of items 1 to 5, wherein a ratio of the first component is from approximately 5% by weight to approximately 50% by weight, and a ratio of the second component is from approximately 35% by weight to approximately 70% by weight, based on the total weight of the liquid crystal composition.

7. The liquid crystal composition according to any one of items 1 to 6, wherein the composition further comprises at least one compound selected from the group of compounds represented by formula (3) as a third component:

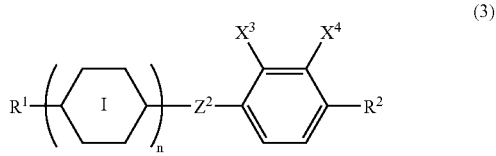

wherein $R^1$ and $R^2$ are each independently alkyl having 1 to 12 carbons, alkoxy having 1 to 12 carbons or alkenyl having 2 to 12 carbons; ring I is independently 1,4-cyclohexylene or 1,4-phenylene; $Z^2$ is a single bond, ethylene, carbonyloxy or methyleneoxy; $X^3$ and $X^4$ are each independently fluorine or chlorine; and n is 1 or 2.

8. The liquid crystal composition according to item 7, wherein the third component is at least one compound selected from the group of compounds represented by formulas (3-1) to (3-12):

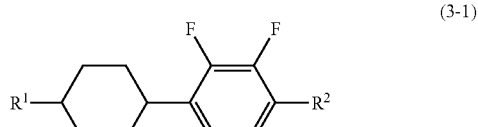

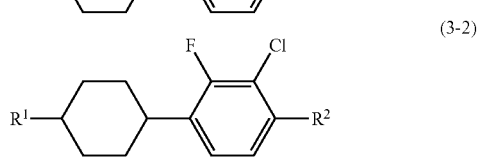

-continued

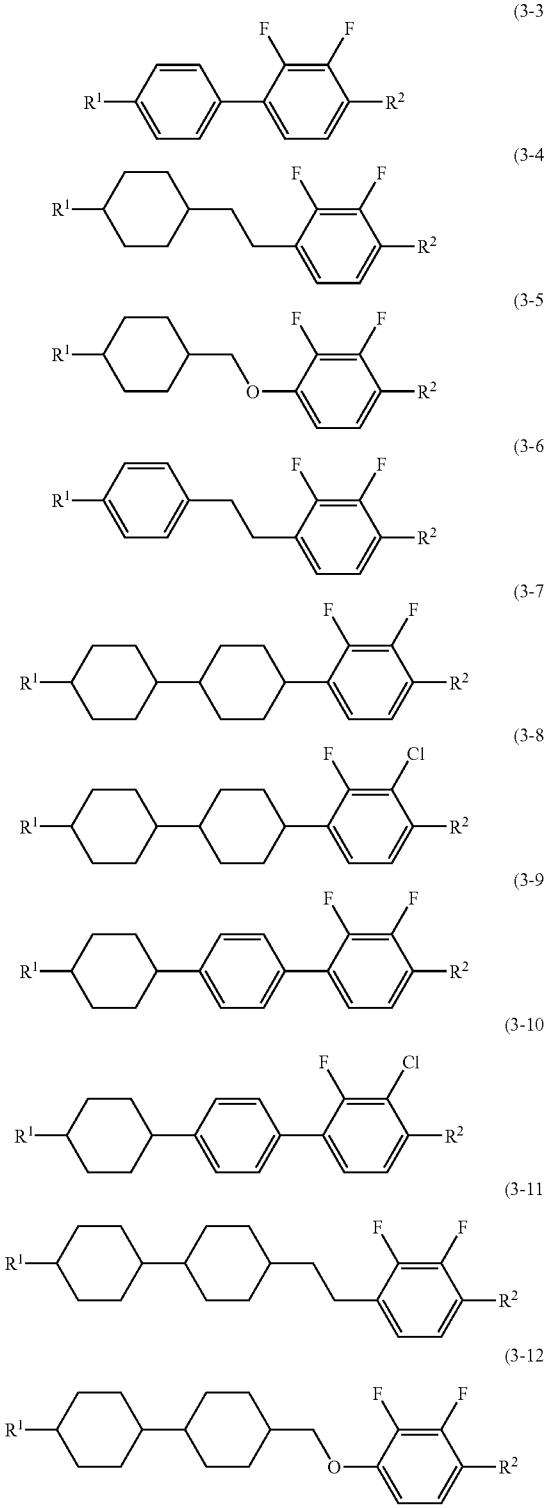

wherein R¹ and R² are each independently alkyl having 1 to 12 carbons, alkoxy having 1 to 12 carbons or alkenyl having 2 to 12 carbons.

9. The liquid crystal composition according to item 7, wherein the third component is a mixture of at least one compound selected from the group of compounds represented by formula (3-1) and at least one compound selected from the group of compounds represented by formula (3-7).

10. The liquid crystal composition according to item 7, wherein the third component is a mixture of at least one compound selected from the group of compounds represented by formula (3-1) and at least one compound selected from the group of compounds represented by formula (3-9).

11. The liquid crystal composition according to item 7, wherein the third component is a mixture of at least one compound selected from the group of compounds represented by formula (3-4) and at least one compound selected from the group of compounds represented by formula (3-9).

12. The liquid crystal composition according to any one of items 7 to 11, wherein a ratio of the first component is from approximately 5% by weight to approximately 50% by weight, a ratio of the second component is from approximately 35% by weight to approximately 70% by weight, and a ratio of the third component is from approximately 5% by weight to approximately 40% by weight, based on the total weight of the liquid crystal composition.

13. The liquid crystal composition according to any one of items 1 to 12, wherein the composition has a maximum temperature of a nematic phase of approximately 70° C. or more, an optical anisotropy (25° C.) at a wavelength of 589 nm of approximately 0.08 or more, and a dielectric anisotropy (25° C.) at a frequency of 1 kHz of approximately −2 or less.

14. A liquid crystal display device that includes the liquid crystal composition according to any one of items 1 to 13.

15. The liquid crystal display device according to item 14, wherein the liquid crystal display device has an operation mode of a VA mode or an IPS mode, and has a driving mode of an active matrix mode.

16. The liquid crystal display device according to item 14, wherein the liquid crystal display device has an operation mode of a PSA mode, and has a driving mode of an active matrix mode.

The invention further includes: (1) the composition described above, wherein the composition further contains an optically active compound; (2) the composition described above, wherein the composition further contains an additive, such as an antioxidant, an ultraviolet light absorbent, a defoaming agent, a polymerizable compound and/or a polymerization initiator; (3) an AM device containing the composition described above; (4) a device having a TN, ECB, OCB, IPS, VA or PSA mode, containing the composition described above; (5) a device of a transmission type, containing the composition described above; (6) use of the composition described above as a composition having a nematic phase; and (7) use as an optically active composition by adding an optically active compound to the composition described above.

The composition of the invention will be explained in the following order. First, the constitution of component compounds in the composition will be explained. Second, the main characteristics of the component compounds and the main effects of the compounds on the composition will be explained. Third, desirable ratios of the component compounds and the basis thereof will be explained. Fourth, a desirable embodiment of the component compounds will be explained. Fifth, examples of the component compound will be shown. Sixth, additives that may be added to the composition will be explained. Seventh, the preparation methods of the component compound will be explained. Lastly, use of the composition will be explained.

First, the constitution of component compounds in the composition will be explained. The composition of the invention is classified into the composition A and the composition B. The composition A may further contain other compounds such as another liquid crystal compound, an additive, an impurity, and so forth. This liquid crystal compound is different from the compound (1-1), the compound (1-2), the compound (2-1), the compound (2-2), the compound (2-3) and the compound (3). Such a liquid crystal compound is mixed with the composition for the purpose of adjusting the characteristics of the composition. Among the liquid crystal compounds, an amount of a cyano compound is desirably small from the viewpoint of stability to heat or ultraviolet light. The amount of a cyano compound is more desirably approximately 0% by weight. The additive includes an optically active compound, an antioxidant, an ultraviolet light absorbent, a coloring matter, a defoaming agent, a polymerizable compound, a polymerization initiator and so forth. The impurity is a compound and so forth contaminated in the process such as the synthesis of a component compound and so forth. This compound is classified into an impurity even when the compound is a liquid crystal compound.

The composition B essentially consists of the compounds selected from the compound (1-1), the compound (1-2), the compound (2-1), the compound (2-2), the compound (2-3) and the compound (3). The term "essentially" means that the composition does not contain a liquid crystal compound which is different from these compounds. The term "essentially" also means that the composition may further contain the additive, the impurity, and so forth. The components of the composition B are fewer than those of the composition A. The composition B is preferable to the composition A from the viewpoint of costs. The composition A is preferable to the composition B, because characteristics of the composition A can be further adjusted by mixing with other liquid crystal compounds.

Second, the main characteristics of the component compounds and the main effects of the compounds on the composition will be explained. The main characteristics of the component compounds are summarized in Table 2. In Table 2, the symbol L represents large or high, the symbol M represents a middle degree, and the symbol S represents small or low. The symbols L, M and S are classification based on qualitative comparison among the component compounds.

TABLE 2

Characteristics of Compounds

| Compound | (1-1) | (1-2) | (2-1) | (2-2) | (2-3) | (3) |
|---|---|---|---|---|---|---|
| Maximum temperature | S | M | S | M | L | S-M |
| Viscosity | M-L | M-L | S | S-M | M | M-L |
| Optical anisotropy | M | M-L | S-M | S-L | M-L | M-L |
| Dielectric anisotropy | M-L[1] | M-L[1] | S | S | S | M-L[1] |
| Specific resistance | L | L | L | L | L | L |

[1] A value of dielectric anisotropy is negative, and the symbols show magnitude of absolute values.

The main effects of the component compounds to the characteristics of the composition upon mixing the component compounds to the composition are as follows. The compound (1-1) increases the absolute value of the dielectric anisotropy. The compound (1-2) increases the absolute value of the dielectric anisotropy and increases the maximum temperature. The compound (2-1) decreases the viscosity. The compound (2-2) decreases the minimum temperature and decreases the viscosity. The compound (2-3) increases the maximum temperature, increases the optical anisotropy and decreases the viscosity. The compound (3) decreases the minimum temperature and increases the absolute value of the dielectric anisotropy.

Third, desirable ratios of the component compounds and the basis therefor will be explained. A desirable ratio of the first component is approximately 5% by weight or more for increasing the absolute value of the dielectric anisotropy, and is approximately 50% by weight or less for decreasing the minimum temperature. A more desirable ratio is from approximately 10% by weight to approximately 45% by weight. A particularly desirable ratio is from approximately 15% by weight to approximately 45% by weight.

A desirable ratio of the second component is approximately 35% by weight or more for increasing the optical anisotropy and decreasing the viscosity, and is approximately 70% by weight or less for decreasing the minimum temperature. A more desirable ratio is from approximately 35% by weight to approximately 65% by weight. A particularly desirable ratio is from approximately 40% by weight to approximately 65% by weight.

In the case where the third component is used, a desirable ratio thereof is approximately 5% by weight or more for increasing the absolute value of the dielectric anisotropy, and is approximately 40% by weight or less for decreasing the minimum temperature. A more desirable ratio is from approximately 5% by weight to approximately 35% by weight. A particularly desirable ratio is from approximately 10% by weight to approximately 35% by weight.

Fourth, a desirable embodiment of the component compound will be explained. $R^1$ and $R^2$ are each independently alkyl having 1 to 12 carbons, alkoxy having 1 to 12 carbons or alkenyl having 2 to 12 carbons. Desirable $R^1$ is alkyl having 1 to 12 carbons or alkenyl having 2 to 12 carbons in order to decrease the minimum temperature and to decrease the viscosity. Desirable $R^2$ is alkoxy having 1 to 12 carbons in order to increase the absolute value of the dielectric anisotropy. $R^3$ and $R^4$ are each independently alkyl having 1 to 12 carbons or alkenyl having 2 to 12 carbons, provided that in the alkyl and the alkenyl, arbitrary hydrogen may be replaced by fluorine, and arbitrary —$CH_2$— may be replaced by —O—. Desirable $R^3$ and $R^4$ are each alkyl having 1 to 12 carbons in order to enhance the stability to ultraviolet light or heat.

Desirable alkyl is methyl, ethyl, propyl, butyl, pentyl, hexyl, heptyl, or octyl. More desirable alkyl is ethyl, propyl, butyl, pentyl, or heptyl for decreasing a viscosity.

Desirable alkoxy is methoxy, ethoxy, propoxy, butoxy, pentyloxy, hexyloxy, or heptyloxy. More desirable alkoxy is methoxy or ethoxy for decreasing a viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl is vinyl, 1-propenyl, 3-butenyl, or 3-pentenyl for decreasing a viscosity. A desirable configuration of —CH=CH— in these alkenyls depends on the position of a double bond. Trans is desirable in the alkenyl such as 1-propenyl, 1-butenyl, 1-pentenyl, 1-hexenyl, 3-pentenyl, and 3-hexenyl for decreasing the viscosity. Cis is desirable in the alkenyl such as 2-butenyl, 2-pentenyl and 2-hexenyl. In these alkenyls, linear alkenyl is preferable to branched alkenyl.

Preferred examples of alkenyl in which arbitrary hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. More preferred examples thereof include 2,2-difluorovinyl and 4,4-difluoro-3-butenyl for decreasing the viscosity.

Ring A, ring B, ring C and ring D are each independently 1,4-cyclohexylene or 1,4-phenylene. Desirable ring A and ring B are each 1,4-phenylene in order to increase the optical anisotropy. Desirable ring C and ring D are each 1,4-cyclohexylene in order to increase the maximum temperature and to decrease the viscosity. Ring E and ring G are each independently 1,4-cyclohexylene, 1,4-phenylene, 2-fluoro-1,4-phenylene or 3-fluoro-1,4-phenylene. Desirable ring E and ring G are each 1,4-cyclohexylene in order to increase the maximum temperature and to decrease the viscosity. Ring F is 1,4-cyclohexylene, 1,4-phenylene, 2-fluoro-1,4-phenylene, 3-fluoro-1,4-phenylene or 2,5-difluoro-1,4-phenylene. Desirable ring F is 1,4-cyclohexylene in order to increase the maximum temperature and to decrease the viscosity. Ring I is 1,4-cyclohexylene or 1,4-phenylene, and in the case where n is 2, two rings I may be the same or different. Desirable ring I is 1,4-cyclohexylene in order to increase the maximum temperature and to decrease the viscosity.

$Z^1$ is a single bond or carbonyloxy. Desirable $Z^1$ is a single bond in order to decrease the viscosity. $Z^2$ is a single bond, ethylene, carbonyloxy or methyleneoxy. Desirable $Z^2$ is a single bond in order to decrease the viscosity.

$X^1$ and $X^2$ are each independently fluorine or chlorine. Desirable $X^1$ and $X^2$ are each fluorine in order to decrease the viscosity. $X^3$ and $X^4$ are each independently fluorine or chlorine. Desirable $X^3$ and $X^4$ are each fluorine in order to decrease the viscosity.

n is 1 or 2. Desirable n is 1 in order to decrease the minimum temperature.

Fifth, examples of the component compounds will be shown. In the desirable compounds described below, $R^5$ and $R^6$ are each independently linear alkyl having 1 to 12 carbons or linear alkenyl having 2 to 12 carbons. $R^7$ is linear alkyl having 1 to 12 carbons or linear alkoxy having 1 to 12 carbons. In these desirable compounds, trans is preferable to cis for the configuration of 1,4-cyclohexylene for increasing a maximum temperature.

Desirable compounds (1-1) are the compounds (1-1-1) to (1-1-8). More desirable compounds (1-1) are the compounds (1-1-1) to (1-1-5). A particularly desirable compound (1-1) is the compound (1-1-5). Desirable compounds (1-2) are the compounds (1-2-1) to (1-2-16). More desirable compounds (1-2) are the compounds (1-2-1), (1-2-5), (1-2-9) and (1-2-13). Particularly desirable compounds (1-2) are the compounds (1-2-1) and (1-2-13). Desirable compounds (2-1) are the compounds (2-1-1) to (2-1-3). A more desirable compound (2-1) is the compound (2-1-1). Desirable compounds (2-2) are the compounds (2-2-1) to (2-2-4). A more desirable compound (2-2) is the compound (2-2-1). Desirable compounds (2-3) are the compounds (2-3-1) to (2-3-4). A more desirable compound (2-3) is the compound (2-3-3). Desirable compounds (3) are the compounds (3-1-1) to (3-12-1). More desirable compounds (3) are the compounds (3-1-1) to (3-5-1), (3-7-1) to (3-9-1), (3-11-1) and (3-12-1). Particularly desirable compounds (3) are the compounds (3-1-1), (3-4-1), (3-7-1), (3-9-1) and (3-12-1).

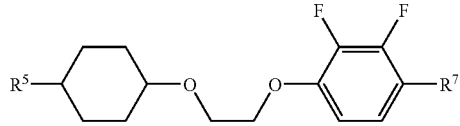

(1-1-1)

-continued

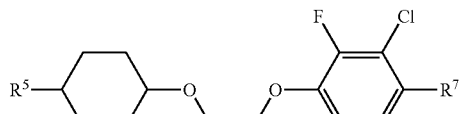

(1-1-2)

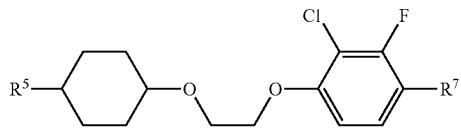

(1-1-3)

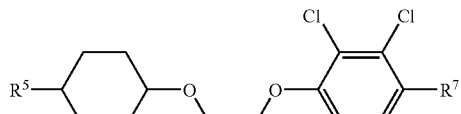

(1-1-4)

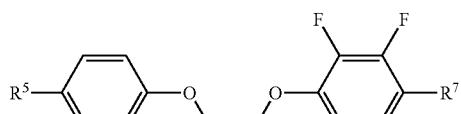

(1-1-5)

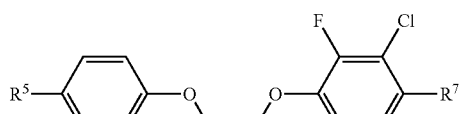

(1-1-6)

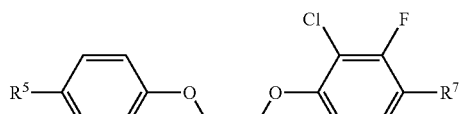

(1-1-7)

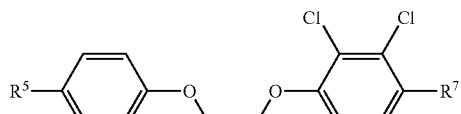

(1-1-8)

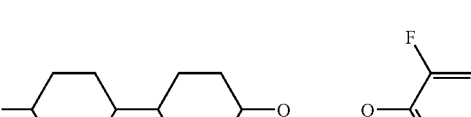

(1-2-1)

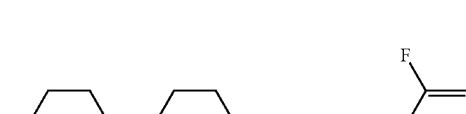

(1-2-2)

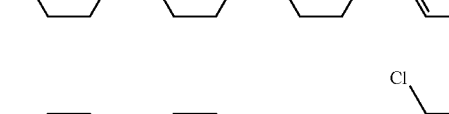

(1-2-3)

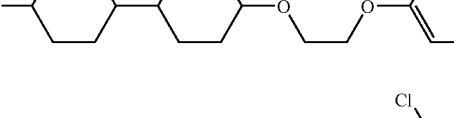

(1-2-4)

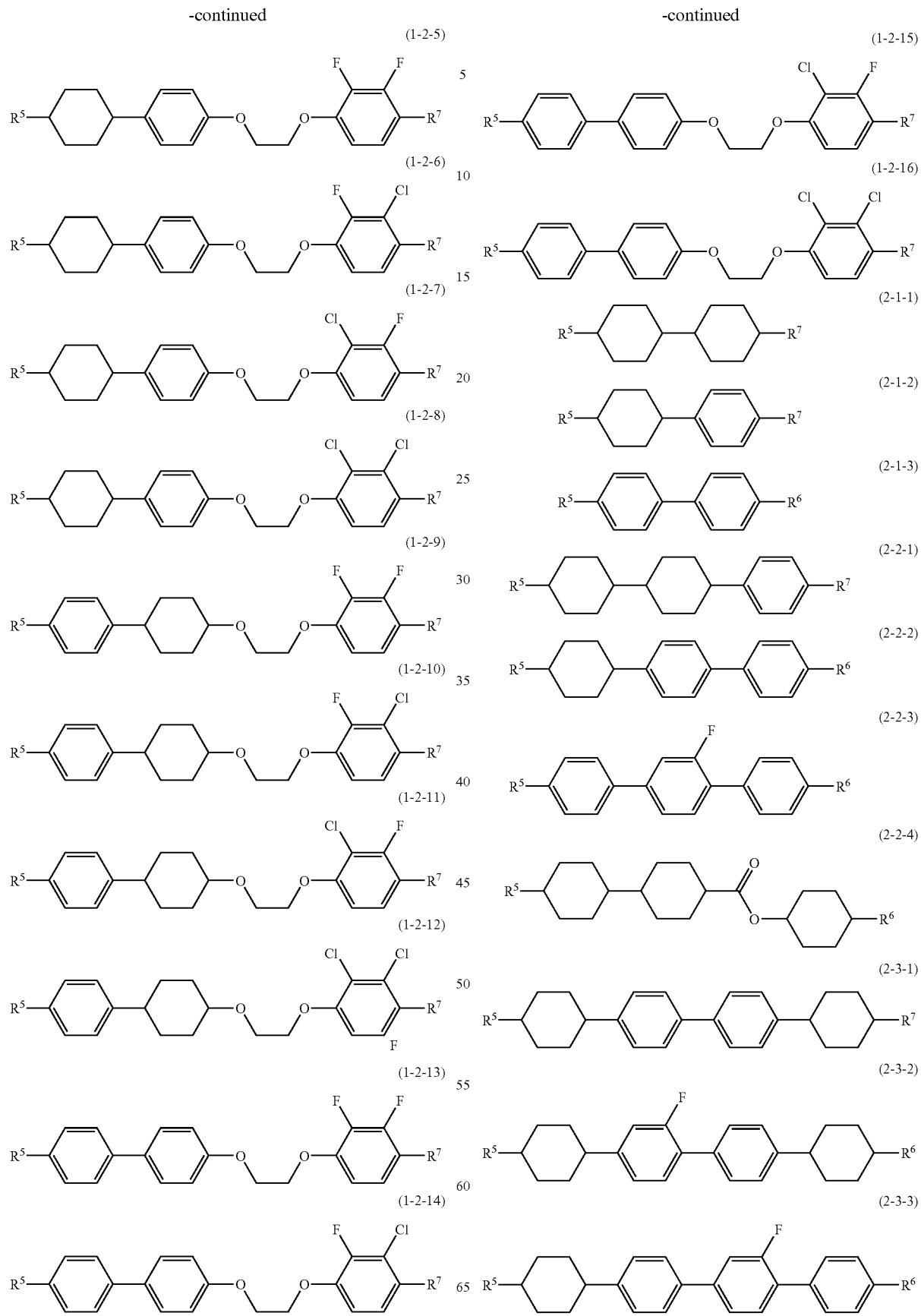

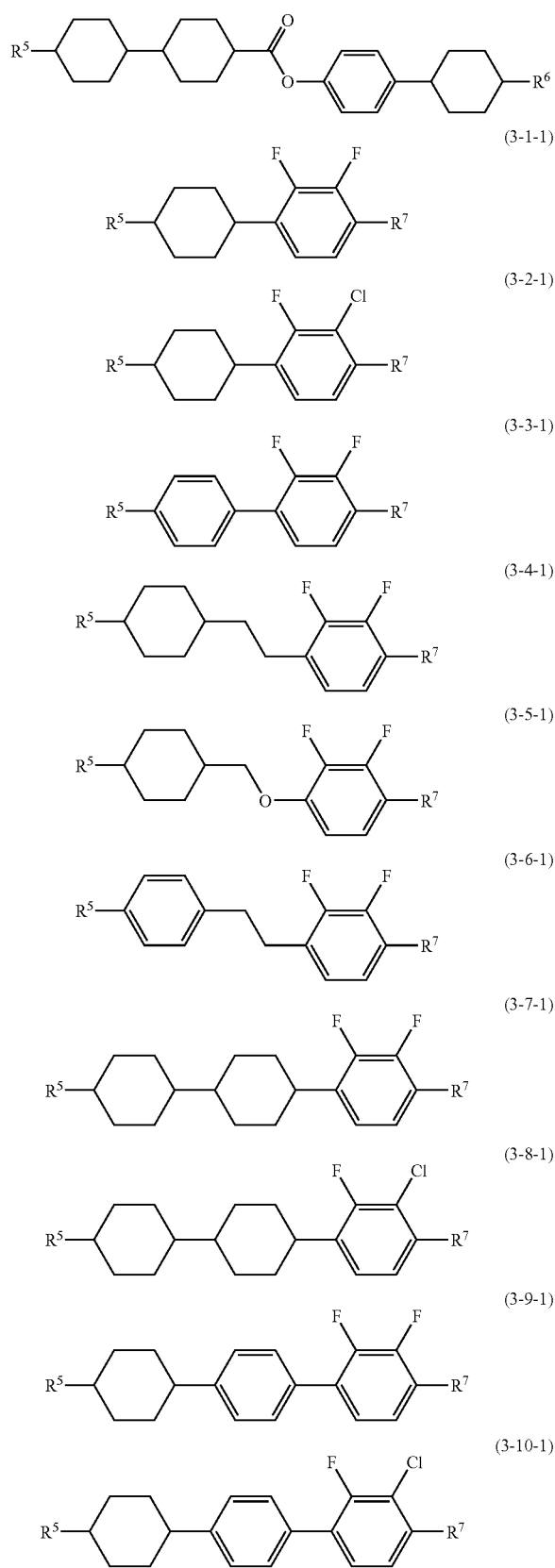
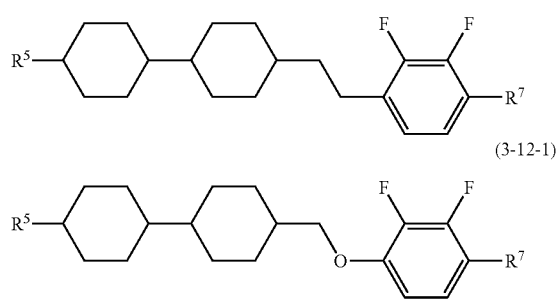

Sixth, additives capable of being mixed with the composition will be explained. The additives include an optically active compound, an antioxidant, an ultraviolet light absorbent, a coloring matter, a defoaming agent, a polymerizable compound, a polymerization initiator and so forth. An optically active compound is mixed in the composition for inducing a helical structure of liquid crystal to provide a twist angle. Examples of the optically active compound include the compounds (4-1) to (4-4) below. A desirable ratio of the optically active compound is approximately 5% by weight or less, and a more desirable ratio thereof ranges from approximately 0.01% by weight to approximately 2%.

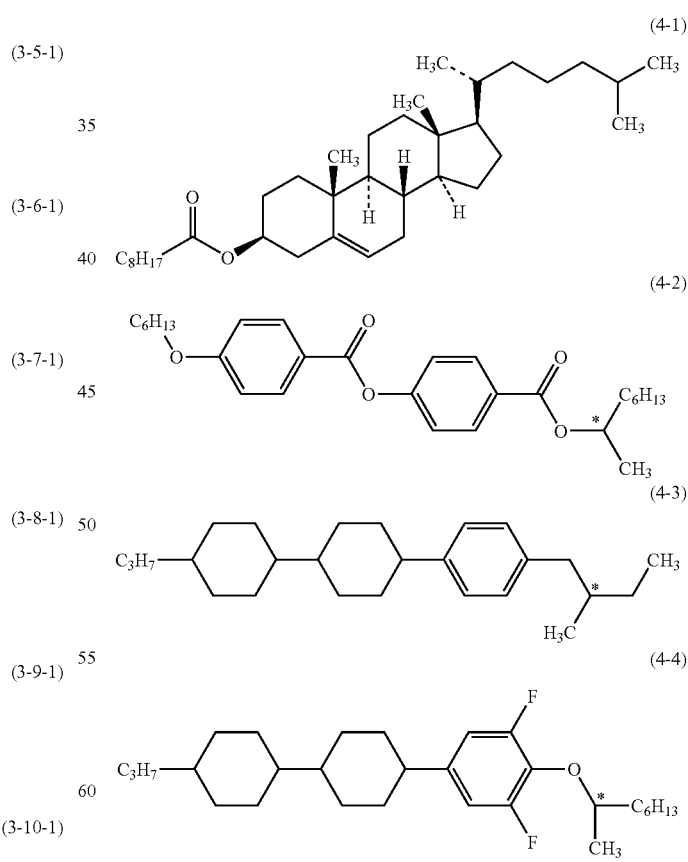

An antioxidant is mixed with the composition in order to avoid a decrease in specific resistance caused by heating in the air, or to maintain a large voltage holding ratio at room temperature and also at a high temperature even after the device has been used for a long time.

Preferred examples of the antioxidant include the compound (5):

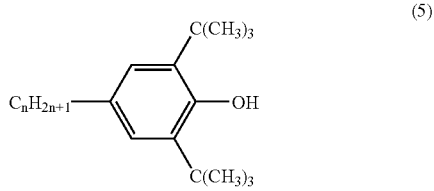

wherein n is an integer of from 1 to 9. In the compound (5), desirable n are 1, 3, 5, 7, or 9. More desirable n are 1 or 7. When n is 1, the compound (5) has a large volatility, and is effective in preventing the decrease of specific resistance caused by heating in the air. When n is 7, the compound (5) has a small volatility, and is effective in maintaining a large voltage holding ratio at room temperature and also at a high temperature even after the device has been used for a long time. A desirable ratio of the antioxidant is approximately 50 ppm or more in order to obtain the advantages thereof and is approximately 600 ppm or less in order to prevent the maximum temperature from being decreased and to prevent the minimum temperature from being increased. A more desirable ratio is from approximately 100 ppm to approximately 300 ppm.

Preferred examples of the ultraviolet light absorbent include a benzophenone derivative, a benzoate derivative and a triazole derivative. A light stabilizer having steric hindrance such as an amine is also desirable. A desirable ratio of the absorbent and the stabilizer is approximately 50 ppm or more for obtaining the advantages thereof and is approximately 10,000 ppm or less for preventing the maximum temperature from being decreased and preventing the minimum temperature from being increased. A more desirable ratio thereof ranges from approximately 100 ppm to approximately 10,000 ppm.

A dichroic dye such as an azo dye or an anthraquinone dye is mixed with the composition to suit for a device of a guest host (GH) mode. A desirable ratio of the dye ranges from approximately 0.01% to approximately 10%. A defoaming agent such as dimethyl silicone oil or methylphenyl silicone oil is mixed with the composition for preventing foaming. A desirable ratio of the defoaming agent is approximately 1 ppm or more for obtaining the advantages thereof and is approximately 1,000 ppm or less for preventing display failure from occurring. A more desirable ratio thereof ranges from approximately 1 ppm to approximately 500 ppm.

A polymerizable compound is mixed with the composition for applying the composition to a device having a PSA (polymer sustained alignment) mode. Preferred examples of the polymerizable compound include compounds having a polymerizable group, such as acrylate, methacrylate, vinyl, vinyloxy, propenyl ether, epoxy, vinylketone, oxetane and so forth. Particularly preferred examples thereof include derivatives of acrylate or methacrylate. A desirable ratio of the polymerizable group is from approximately 0.05% by weigh or more for obtaining the advantages thereof, and is approximately 10% by weight or less for preventing display failure from occurring. A more desirable ratio is from approximately 0.1 to approximately 2%. The polymerizable compound is polymerized preferably in the presence of a suitable initiator, such as a photopolymerization initiator, under radiation of ultraviolet light. Suitable conditions for polymerization and a suitable type and a suitable amount of the initiator have been known by a skilled person in the art and are disclosed in literatures. Examples of the photopolymerization initiator suitable for radical polymerization include Irgacure 651 (trade name), Irgacure 184 (trade name) and Darocure 1173 (trade name), all produced by Ciba Japan K.K. The polymerizable compound preferably contains a photopolymerization initiator in an amount of from approximately 0.1 to approximately 5% by weight, and particularly preferably contains a photopolymerization initiator in an amount of from approximately 1 to approximately 3% by weight.

Seventh, the preparation methods of the component compounds will be explained. These compounds can be prepared by known methods. The preparation method will be exemplified below. The compounds (1-1) and (1-2) are prepared by the method disclosed in JP H10-237004 A/1998. The compound (2-1-1) is prepared by the method disclosed in JP S59-70624 A/1984. The compound (2-2-1) is prepared by the method disclosed in JP S57-165328 A/1982. The compound (2-3-3) is prepared by the method disclosed in JP H2-237949 A/1990. The compounds (3-1) and (3-7) are prepared by the method disclosed in JP-T H2-503441 A/1990. The antioxidant is commercially available. The compound (5), wherein n is 1, is available, for example, from Sigma-Aldrich, Inc. The compound (5), wherein n is 7, is prepared by the method disclosed in U.S. Pat. No. 3,660,505.

The compounds for which preparation methods were not described above can be prepared according to the methods described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.), and so forth. The composition is prepared according to known methods using the compounds thus obtained. For example, the component compounds are mixed and dissolved in each other by heating.

Last, use of the composition will be explained. Most of the compositions have a minimum temperature of approximately −10° C. or less, a maximum temperature of approximately 70° C. or more, and an optical anisotropy of approximately 0.07 to approximately 0.20. The device containing the composition has a large voltage holding ratio. The composition is suitable for an AM device. The composition is suitable especially for an AM device of a transmission type. The composition having an optical anisotropy of approximately 0.08 to approximately 0.25 and further having an optical anisotropy of approximately 0.10 to approximately 0.30 may be prepared by controlling ratios of the component compounds or by mixing other liquid crystal compounds. The composition can be used as a composition having a nematic phase and as an optically active composition by adding an optically active compound.

The composition can be used for an AM device. It can also be used for a PM device. The composition can also be used for an AM device and a PM device having a mode such as PC, TN, STN, ECB, OCB, IPS, VA, PSA and so forth. It is desirable to use the composition for an AM device having an IPS or VA mode. These devices may be of a reflection type, a transmission type or a semi-transmission type. It is desirable to use the composition for a device of a transmission type. It can be used for an amorphous silicon-TFT device or a poly-crystal silicon-TFT device. The composition is also usable for a nematic curvilinear aligned phase (NCAP) device prepared by microcapsulating the composition, and for a polymer dispersed (PD) device in which a three dimensional net-work polymer is formed in the composition.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

When a sample was a composition, it was measured as it was, and the obtained value is described here. When a sample was a compound, a sample for measurement was prepared by mixing 15% by weight of the compound and 85% by weight of mother liquid crystals. A value of characteristic of the compound was calculated by extrapolating from a value obtained by measurement. Namely: extrapolated value= (value measured for sample−0.85×value measured for mother liquid crystals)/0.15. When a smectic phase (or crystals) was separated out at this ratio at 25° C., a ratio of the compound and mother liquid crystals was changed step by step in the order of (10% by weight/90% by weight), (5% by weight/95% by weight), (1% by weight/99% by weight), respectively. Values for a maximum temperature, optical anisotropy, viscosity, and dielectric anisotropy of the compound were obtained by the extrapolation.

The composition of the mother liquid crystals is as shown below. All the percentages for the composition are percentage by weight.

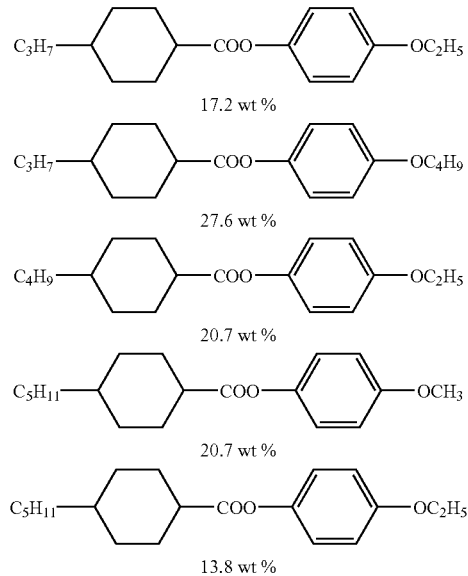

Measurement of the characteristics was carried out according to the following methods. Most methods are described in the Standard of Electric Industries Association of Japan, EIAJ ED-2521 A or those with some modifications.

Maximum Temperature of a Nematic Phase (NI; ° C.): A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature."

Minimum Temperature of a Nematic Phase (Tc; ° C.): A sample having a nematic phase was put in a glass vial and then kept in a freezer at temperatures of 0° C., −10° C., −20° C., −30° C., and −40° C. for ten days, respectively, and a liquid crystal phase was observed. For example, when the sample remained in a nematic phase at −20° C. and changed to crystals or a smectic phase at −30° C., Tc was expressed as ≦−20° C. A lower limit of a temperature range of a nematic phase may be abbreviated to "a minimum temperature."

Viscosity ($\eta$; measured at 20° C., mPa·s): A viscosity was measured by means of an E-type viscometer.

Optical Anisotropy (refractive index an isotropy; $\Delta n$; measured at 25° C.): Measurement was carried out with an Abbe refractometer mounting a polarizing plate on an ocular using a light at a wavelength of 589 nm. The surface of a main prism was rubbed in one direction, and then a sample was dropped on the main prism. Refractive index (n∥) was measured when the direction of a polarized light was parallel to that of the rubbing. Refractive index (n⊥) was measured when the direction of a polarized light was perpendicular to that of the rubbing. A value of optical anisotropy was calculated from the equation: $\Delta n = n\| - n\bot$.

Dielectric Anisotropy ($\Delta\epsilon$; measured at 25° C.): A value of a dielectric anisotropy was calculated from the equation: $\Delta\epsilon = \epsilon\| - \epsilon\bot$. The values of dielectric anisotropy ($\epsilon\|$ and $\epsilon\bot$) were measured in the following manner.

(1) Measurement of dielectric anisotropy ($\epsilon\|$): A solution of octadecyltriethoxysilane (0.16 mL) dissolved in ethanol (20 mL) was coated on a glass substrate having been well cleaned. The glass substrate was rotated with a spinner and then heated to 150° C. for 1 hour. A sample was charged in a VA device having a distance (cell gap) of 4 μm between two sheets of the glass substrates, and the device was sealed with an adhesive capable of being cured with ultraviolet light. Sine waves (0.5 V, 1 kHz) were applied to the device, and after lapsing two seconds, a dielectric constant ($\epsilon\|$) in the major axis direction of the liquid crystal molecule was measured.

(2) Measurement of dielectric anisotropy ($\epsilon\bot$): Polyimide was coated on a glass substrate having been well cleaned. The glass substrate was baked, and the resulting orientation film was subjected to a rubbing treatment. A sample was charged in a TN device having a distance between two sheets of the glass substrates of 9 μm and a twisted angle of 80°. Sine waves (0.5 V, 1 kHz) were applied to the device, and after lapsing two seconds, a dielectric constant ($\epsilon\bot$) in the minor axis direction of the liquid crystal molecule was measured.

Threshold Voltage (Vth; measured at 25° C.; V): Measurement was carried out with LCD Evaluation System Model LCD-5100 made by Otsuka Electronics Co., Ltd. The light source was a halogen lamp. A sample was poured into a VA device of a normally black mode, in which a cell gap between two glass plates was 4 μm, and a rubbing direction was antiparallel, and the device was sealed with a UV curing adhesive. Voltage to be applied onto the device (60 Hz, rectangular waves) was increased stepwise by 0.02 V starting from 0 V up to 20 V. During the stepwise increasing, the device was irradiated with light in a perpendicular direction, and an amount of the light passing through the device was measured. Voltage-transmission curve was prepared, in which a maximum amount of a light corresponded to 100% transmittance, a minimum amount of a light corresponded to 0% transmittance. Threshold voltage is a value at 10% transmittance.

Voltage Holding Ratio (VHR-1; measured at 25° C.; %): A TN device used for measurement has a polyimide-alignment film and the cell gap between two glass plates is 5 μm. A sample was poured into the device, and then the device was sealed with an adhesive which is polymerized by the irradiation of an ultraviolet light. The TN device was impressed and charged with pulse voltage (60 microseconds at 5 V). Decreasing voltage was measured for 16.7 milliseconds with High Speed Voltmeter and the area A between a voltage curve and a horizontal axis in a unit cycle was obtained. The area B was an area without decreasing. Voltage holding ratio is a percentage of the area A to the area B.

Voltage Holding Ratio (VHR-2; measured at 80° C.; %): A TN device used for measurement has a polyimide-alignment film and the cell gap between two glass plates is 5 μm. A sample was poured into the device, and then the device was sealed with an adhesive which is polymerized by the irradiation of an ultraviolet light. The TN device was impressed and charged with pulse voltage (60 microseconds at 5 V). Decreasing voltage was measured for 16.7 milliseconds with High Speed Voltmeter and the area A between a voltage curve and a horizontal axis in a unit cycle was obtained. The area B was an area without decreasing. Voltage holding ratio is a percentage of the area A to the area B.

Voltage Holding Ratio (VHR-3; measured at 25° C.; %): A voltage holding ratio was measured after irradiating with ultraviolet light to evaluate stability to ultraviolet light. A composition having large VHR-3 has a large stability to ultraviolet light. A TN device used for measurement has a polyimide-alignment film and the cell gap is 5 μm. A sample was poured into the device, and then the device was irradiated with light for 20 minutes. The light source was a superhigh voltage mercury lamp USH-500D (produced by Ushio, Inc.), and the distance between the device and the light source is 20 cm. In measurement of VHR-3, a decreasing voltage is measured for 16.7 milliseconds. VHR-3 is desirably 90% or more, and more desirably 95% or more.

Voltage Holding Ratio (VHR-4; measured at 25° C.; %): A voltage holding ratio was measured after heating an TN device having a sample poured therein in a constant-temperature bath at 80° C. for 500 hours to evaluate stability to heat. A composition having large VHR-4 has a large stability to heat. In measurement of VHR-4, a decreasing voltage is measured for 16.7 milliseconds.

Response Time (r; measured at 25° C.; ms): Measurement was carried out with LCD Evaluation System Model LCD-5100 made by Otsuka Electronics Co., Ltd. Light source is a halogen lamp. Low-pass filter was set at 5 kHz. A sample was poured into a VA device of a normally black mode, in which a cell gap between two glass plates was 4 μm, and a rubbing direction was antiparallel, and the device was sealed with a UV curing adhesive. Rectangle waves (60 Hz, 10 V, 0.5 seconds) were applied to the device. During application, the device was irradiated with light in a perpendicular direction, and an amount of the light passing through the device was measured. A maximum amount of a light corresponds to 100% transmittance, and a minimum amount of a light corresponds to 0% transmission. Response time is a period of time required for the change in transmittance from 90% to 10% (fall time: ms).

Specific Resistance (ρ; measured at 25° C.; Ωcm): 1.0 mL of a sample was charged in a vessel equipped with electrodes. A direct current voltage of 10 V was impressed to the vessel, and after lapsing 10 second from the impress of voltage, the direct electric current was measured. The specific resistance was calculated by the equation: (specific resistance)={(voltage)×(electric capacity of vessel)}/{(direct current)×(dielectric constant of vacuum)}.

Gas Chromatographic Analysis: A Gas Chromatograph Model GC-14B made by Shimadzu was used for measurement. The carrier gas was helium (2 milliliters per minute). An evaporator and a detector (FID) were set up at 280° C. and 300° C., respectively. Capillary column DB-1 (length 30 meters, bore 0.32 millimeters, film thickness 0.25 micrometers, dimethylpolysiloxane as stationary phase, no polarity) made by Agilent Technologies, Inc. was used for the separation of the component compound. After the column had been kept at 200° C. for 2 minutes, it was further heated to 280° C. at the rate of 5° C. per minute. A sample was prepared in an acetone solution (0.1% by weight), and 1 microliter of the solution was injected into the evaporator. The recorder used was a Chromatopac Model C-R5A made by Shimadzu or its equivalent. Gas chromatogram obtained showed a retention time of a peak and a peak area corresponding to the component compound.

Solvents for diluting the sample may also be chloroform, hexane, and so forth. The following capillary columns may also be used for the separation of the component compound: HP-1 made by Agilent Technologies Inc. (length 30 meters, bore 0.32 millimeters, film thickness 0.25 micrometers), Rtx-1 made by Restek Corporation (length 30 meters, bore 0.32 millimeters, film thickness 0.25 micrometers), and BP-1 made by SGE International Pty. Ltd. (length 30 meters, bore 0.32 millimeters, film thickness 0.25 micrometers). In order to prevent compound peaks from overlapping, a capillary column CBP1-M50-025 (50 meters, bore 0.25 millimeters, film thickness 0.25 micrometers) made by Shimadzu Corporation may be used.

The ratios of the liquid crystal compounds contained in the composition can also be calculated in the following manner. A liquid crystal compound can be detected by gas chromatography. An area ratio of peaks on a gas chromatogram corresponds to a ratio (molar number) of liquid crystal compounds. In the case where the aforementioned capillary columns are used, correction coefficients of the liquid crystal compounds can be regarded as 1. Accordingly, the ratio (% by weight) of liquid crystal compounds is calculated from the area ratio of peaks.

The invention will be explained in detail by way of Examples. The invention is not limited by the Examples described below. The compounds described in the Comparative Examples and the Examples are expressed by the symbols according to the definition in Table 3. In Table 3, the configuration of 1,4-cyclohexylene is trans. The parenthesized number next to the symbolized compounds in the Examples corresponds to the number of the desirable compound. The symbol (-) means other liquid crystal compound. A ratio (percentage) of a liquid crystal compound is percentage by weight (% by weight) based on the total weight of liquid crystal compounds, and the liquid crystal compositions further contain impurities. Last, the characteristics of the composition are summarized.

TABLE 3

Method of Description of Compound using Symbols
$R-(A_1)-Z_1-\ldots-Z_n-(A_n)-R'$

| (1) Left Terminal Group R- | Symbol |
|---|---|
| $C_nH_{2n+1}-$ | n- |
| $C_nH_{2n+1}O-$ | nO- |

TABLE 3-continued

Method of Description of Compound using Symbols
R-(A$_1$)-Z$_1$- ... -Z$_n$-(A$_n$)-R'

| | |
|---|---|
| C$_m$H$_{2m+1}$OC$_n$H$_{2n}$— | mOn- |
| CH$_2$=CH— | V- |
| C$_n$H$_{2n+1}$—CH=CH— | nV- |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF- |
| CF$_2$=CH—C$_n$H$_{2n}$— | VFFn- |

| (2) Right Terminal Group -R' | Symbol |
|---|---|
| —C$_n$H$_{2n+1}$ | -n |
| —OC$_n$H$_{2n+1}$ | -On |
| —CH=CH$_2$ | -V |
| —CH=CH—C$_n$H$_{2n+1}$ | -Vn |
| —C$_n$H$_{2n}$—CH=CH$_2$ | -nV |
| —CH=CF$_2$ | -VFF |
| —COOCH$_3$ | -EMe |

| (3) Bonding Group -Zn- | Symbol |
|---|---|
| —OC$_n$H$_{2n}$O— | OnO |
| —C$_n$H$_{2n}$— | n |
| —COO— | E |
| —CH=CH— | V |
| —CH$_2$O— | 1O |
| —OCH$_2$— | O1 |
| —SiH$_2$— | Si |

| (4) Ring structure -An- | Symbol |
|---|---|
|  | H |
| 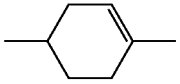 | ch |
| 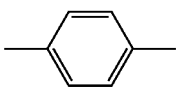 | B |
| 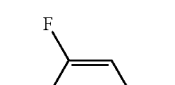 | B(2F) |
| 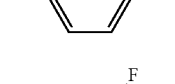 | B(3F) |
| 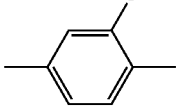 | B(2F,3F) |
| 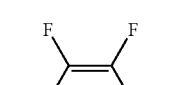 | B(2F,3Cl) |
| 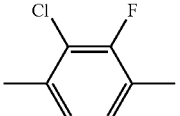 | B(2Cl,3F) |
| 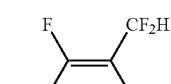 | B(2F,3CF2H) |

(5) Example of Description

Example 1  3-HO2OB(2F,3F)-O2

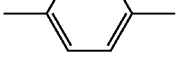

Example 2  3-HHO2OB(2F,3F)-4

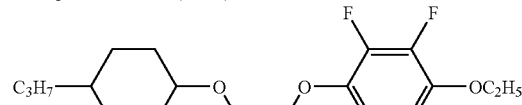

Example 3  5-HBB(3F)B-3

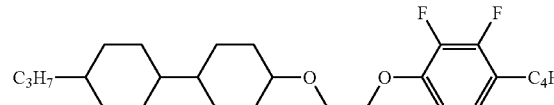

Example 4  3-HBB(2F,3F)-O2

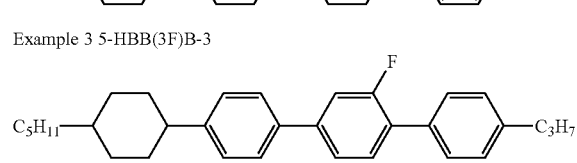

Comparative Example 1

A composition corresponding to Example 22 of JP 2007-002132 A/2007 was prepared and measured for characteristics by the aforementioned manners. The basis is that the composition contains the compound (1-2-9) and a compound analogous to the compound (1-2), and has the minimum viscosity (η). The components and characteristics of the composition were as follows.

| | | |
|---|---|---|
| 3-HB(2F)-O2 | (—) | 10% |
| 3-HB(3F)-O2 | (—) | 10% |
| 3-HHB(2F)-1 | (—) | 4% |
| 3-HHB(2F)-O2 | (—) | 4% |
| 3-HHB(3F)-1 | (—) | 4% |
| 3-H1OB(2F)-O2 | (—) | 14% |
| 3-HV1OB(2F,3F)-O2 | (—) | 6% |
| 3-HO1VB(2F,3F)-O2 | (—) | 6% |
| 3-BV1OB(2F,3F)-O1 | (—) | 1% |
| 5-BVO1B(2F,3F)-1 | (—) | 1% |
| 2-H4HB(2F,3F)-O2 | (—) | 1% |
| 2-HO2OHB(2F,3F)-O1 | (1-2-1) analog | 1% |
| 2-HV1OHB(2F,3F)-O2 | (—) | 9% |

-continued

| | | |
|---|---|---|
| 3-HO1VHB(2F,3F)-O2 | (—) | 9% |
| 3-HHVB(2F,3F)-O2 | (—) | 1% |
| 2-HHV1OB(2F,3F)-1 | (—) | 8% |
| 3-HHO1VB(2F,3F)-1 | (—) | 8% |
| 3-HB(2F)V1OB(2F,3CF2H)-O2 | (—) | 1% |
| 2-BH4B(2F,3F)-O1 | (—) | 1% |
| 3-BHO2OB(2F,3F)-1 | (1-2-9) | 1% |

NI = 67.3° C.;
Tc ≦ −20° C.;
Δn = 0.096;
Δε = −4.1;
η = 22.0 mPa · s;
VHR-1 = 99.0%

Example 1

The composition of Example 1 has a high maximum temperature of a nematic phase, a small viscosity and a large refractive index anisotropy as compared to Comparative Example 1.

| | | |
|---|---|---|
| 3-HHO2OB(2F,3F)-O2 | (1-2-1) | 6% |
| 5-HHO2OB(2F,3F)-O2 | (1-2-1) | 7% |
| 3-HBO2OB(2F,3F)-O2 | (1-2-5) | 7% |
| 5-HBO2OB(2F,3F)-O2 | (1-2-5) | 7% |
| 3-BBO2OB(2F,3F)-O2 | (1-2-13) | 7% |
| 5-BBO2OB(2F,3F)-O2 | (1-2-13) | 6% |
| 2-HH-3 | (2-1-1) | 6% |
| 3-HH-5 | (2-1-1) | 7% |
| 3-HH-V1 | (2-1-1) | 10% |
| V2-BB-1 | (2-1-3) | 14% |
| 1V2-BB-1 | (2-1-3) | 14% |
| 3-HHB-O1 | (2-2-1) | 4% |
| 3-HHEBH-3 | (2-3-4) | 5% |

NI = 70.4° C.;
Tc ≦ −20° C.;
Δn = 0.126;
Δε = −2.7;
η = 20.0 mPa · s;
VHR-1 = 99.1%;
VHR-2 = 98.3%;
VHR-3 = 98.1%

Example 2

The composition of Example 2 has a high maximum temperature of a nematic phase, a small viscosity and a large refractive index anisotropy as compared to Comparative Example 1.

| | | |
|---|---|---|
| 3-HO2OB(2F,3F)-O2 | (1-1-1) | 5% |
| 3-HBO2OB(2F,3F)-O2 | (1-2-5) | 7% |
| 5-HBO2OB(2F,3F)-O2 | (1-2-5) | 7% |
| 2-HH-3 | (2-1-1) | 5% |
| 3-HH-V1 | (2-1-1) | 5% |
| 3-HB-O1 | (2-1-2) | 5% |
| V2-BB-1 | (2-1-3) | 15% |
| 1V2-BB-1 | (2-1-3) | 12% |
| 5-HBB(3F)B-2 | (2-3-3) | 5% |
| 3-HHB(2F,3F)-O2 | (3-7-1) | 8% |
| 5-HHB(2F,3F)-O2 | (3-7-1) | 8% |
| 2-HBB(2F,3F)-O2 | (3-9-1) | 5% |
| 3-HBB(2F,3F)-O2 | (3-9-1) | 8% |
| 2-H2H-3 | (—) | 5% |

NI = 76.1° C.;
Tc ≦ −20° C.;
Δn = 0.126;
Δε = −3.1;
η = 20.0 mPa · s

Example 3

The composition of Example 3 has a high maximum temperature of a nematic phase, a small viscosity and a large refractive index anisotropy as compared to Comparative Example 1.

| | | |
|---|---|---|
| 5-HO2OB(2F,3F)-O2 | (1-1-1) | 5% |
| 3-HO2OB(2F,3Cl)-O2 | (1-1-2) | 3% |
| 3-HHO2OB(2F,3F)-O2 | (1-2-1) | 5% |
| 3-BBO2OB(2F,3F)-O2 | (1-2-13) | 8% |
| 3-HH-5 | (2-1-1) | 10% |
| 3-HH-V | (2-1-1) | 15% |
| V2-BB-1 | (2-1-3) | 11% |
| 1V2-BB-1 | (2-1-3) | 6% |
| 3-HB(3F)BH-3 | (2-3-2) | 3% |
| 5-HBB(3F)B-3 | (2-3-3) | 5% |
| 3-H2B(2F,3F)-O2 | (3-4-1) | 8% |
| 3-HBB(2F,3F)-O2 | (3-9-1) | 5% |
| V-HBB(2F,3F)-O2 | (3-9-1) | 8% |
| V2-HBB(2F,3F)-O2 | (3-9-1) | 5% |
| 3-HBB(2F,3Cl)-O2 | (3-10-1) | 3% |

NI = 70.4° C.;
Tc ≦ −20° C.;
Δn = 0.125;
Δε = −2.7;
η = 19.8 mPa · s

Example 4

| | | |
|---|---|---|
| 3-HO2OB(2Cl,3F)-O2 | (1-1-3) | 3% |
| 3-HO2OB(2Cl,3Cl)-O2 | (1-1-4) | 4% |
| 5-HHO2OB(2F,3F)-O2 | (1-2-1) | 6% |
| 3-BBO2OB(2F,3F)-O2 | (1-2-13) | 3% |
| 3-HH-V1 | (2-1-1) | 12% |
| V2-BB-1 | (2-1-3) | 15% |
| 3-HHB-O1 | (2-2-1) | 5% |
| 3-HBB-2 | (2-2-2) | 8% |
| 1V-HBB-2 | (2-2-2) | 8% |
| 2-BB(3F)B-3 | (2-2-3) | 5% |
| 1O1-HBBH-4 | (—) | 3% |
| 3-HB(2F,3F)-O2 | (3-1-1) | 8% |
| 3-BB(2F,3F)-O2 | (3-3-1) | 5% |
| 5-BB(2F,3F)-O2 | (3-3-1) | 5% |
| 3-HH1OB(2F,3F)-O2 | (3-12-1) | 10% |

NI = 72.6° C.;
Tc ≦ −20° C.;
Δn = 0.128;
Δε = −2.7;
η = 19.4 mPa · s

Example 5

| | | |
|---|---|---|
| 3-BO2OB(2F,3F)-O2 | (1-1-5) | 3% |
| 3-HHO2OB(2F,3F)-O2 | (1-2-1) | 8% |
| 3-BBO2OB(2F,3F)-O2 | (1-2-13) | 5% |
| 3-HH-V | (2-1-1) | 11% |
| 3-HH-V1 | (2-1-1) | 11% |
| 3-HB-O1 | (2-1-2) | 5% |
| V-HHB-1 | (2-2-1) | 7% |
| 3-HBB-2 | (2-2-2) | 6% |
| 1V-HBB-2 | (2-2-2) | 6% |
| 2-BB(3F)B-3 | (2-2-3) | 3% |
| V-HB(2F,3F)-O2 | (3-1-1) | 6% |
| 3-BB(2F,3F)-O2 | (3-3-1) | 5% |
| 5-BB(2F,3F)-O2 | (3-3-1) | 5% |

-continued

| | | |
|---|---|---|
| 3-HBB(2F,3F)-O2 | (3-9-1) | 8% |
| V-HBB(2F,3F)-O2 | (3-9-1) | 3% |
| V2-HBB(2F,3F)-O2 | (3-9-1) | 8% |

NI = 77.7° C.;
Tc ≦ −20° C.;
Δn = 0.127;
Δε = −2.7;
η = 19.9 mPa·s

Example 6

| | | |
|---|---|---|
| 3-HO2OB(2F,3F)-O2 | (1-1-1) | 11% |
| 3-BO2OB(2F,3Cl)-O2 | (1-1-6) | 2% |
| 3-BO2OB(2Cl,3F)-O2 | (1-1-7) | 2% |
| 3-HH-5 | (2-1-1) | 4% |
| 3-HH-V1 | (2-1-1) | 10% |
| V2-BB-1 | (2-1-3) | 15% |
| 1V2-BB-1 | (2-1-3) | 10% |
| 3-HHEH-3 | (2-2-4) | 5% |
| 5-HBB(3F)B-3 | (2-3-3) | 5% |
| 2-HBB(2F,3F)-O2 | (3-9-1) | 7% |
| 3-HBB(2F,3F)-O2 | (3-9-1) | 7% |
| V-HBB(2F,3F)-O2 | (3-9-1) | 7% |
| V2-HBB(2F,3F)-O2 | (3-9-1) | 7% |
| 3-HH1OB(2F,3F)-O2 | (3-12-1) | 8% |

NI = 75.0° C.;
Tc ≦ −30° C.;
Δn = 0.129;
Δε = −3.0;
η = 20.0 mPa·s

Example 7

| | | |
|---|---|---|
| 3-BO2OB(2Cl,3Cl)-O2 | (1-1-8) | 3% |
| 5-HHO2OB(2F,3F)-O2 | (1-2-1) | 7% |
| 3-BBO2OB(2F,3F)-O2 | (1-2-13) | 7% |
| 2-HH-3 | (2-1-1) | 8% |
| 3-HH-V1 | (2-1-1) | 10% |
| 5-HH-O1 | (2-1-1) | 3% |
| V2-BB-1 | (2-1-3) | 15% |
| 1V2-BB-1 | (2-1-3) | 7% |
| 5-HBB(3F)B-3 | (2-3-3) | 5% |
| 5-HB(2F,3Cl)-O2 | (3-2-1) | 5% |
| 3-B2B(2F,3F)-O2 | (3-6-1) | 3% |
| V-HHB(2F,3F)-O2 | (3-7-1) | 3% |
| V2-HHB(2F,3F)-O2 | (3-7-1) | 3% |
| 3-HBB(2F,3F)-O2 | (3-9-1) | 8% |
| V2-HBB(2F,3F)-O2 | (3-9-1) | 8% |
| 3-HH1OB(2F,3F)-O2 | (3-12-1) | 5% |

NI = 72.2° C.;
Tc ≦ −20° C.;
Δn = 0.128;
Δε = −3.1;
η = 19.9 mPa·s

Example 8

| | | |
|---|---|---|
| 3-HHO2OB(2F,3F)-O2 | (1-2-1) | 8% |
| 5-HHO2OB(2F,3F)-O2 | (1-2-1) | 8% |
| 3-HBO2OB(2F,3F)-O2 | (1-2-5) | 4% |
| 3-HH-V1 | (2-1-1) | 10% |
| 5-HB-3 | (2-1-2) | 3% |
| V2-BB-1 | (2-1-3) | 15% |
| 1V2-BB-1 | (2-1-3) | 7% |
| 3-HHB-1 | (2-2-1) | 3% |
| V2-HHB-1 | (2-2-1) | 5% |
| V2-BB(3F)B-1 | (2-2-3) | 5% |
| 5-HBBH-3 | (2-3-1) | 3% |
| 3-BB(2F,3F)-O2 | (3-3-1) | 5% |
| 3-HHB(2F,3F)-1 | (3-7-1) | 3% |
| 5-HHB(2F,3Cl)-O2 | (3-8-1) | 3% |
| 2-HBB(2F,3F)-O2 | (3-9-1) | 5% |
| 3-HBB(2F,3F)-O2 | (3-9-1) | 5% |
| 5-HH2B(2F,3F)-O2 | (3-11-1) | 3% |
| 3-HH1OB(2F,3F)-O2 | (3-12-1) | 5% |

NI = 85.2° C.;
Tc ≦ −20° C.;
Δn = 0.130;
Δε = −2.9;
η = 19.3 mPa·s

Example 9

| | | |
|---|---|---|
| 3-HHO2OB(2F,3F)-O2 | (1-2-1) | 8% |
| 5-HHO2OB(2F,3F)-O2 | (1-2-1) | 8% |
| 3-HH-V | (2-1-1) | 8% |
| V2-BB-1 | (2-1-3) | 15% |
| 1V2-BB-1 | (2-1-3) | 7% |
| V2-HHB-1 | (2-2-1) | 5% |
| 2-BB(3F)B-3 | (2-2-3) | 7% |
| 1-BB(3F)B-2V | (2-2-3) | 7% |
| V-HB(2F,3F)-O2 | (3-1-1) | 7% |
| 5-HB(2F,3Cl)-O2 | (3-2-1) | 4% |
| V-HHB(2F,3F)-O2 | (3-7-1) | 7% |
| V2-HHB(2F,3F)-O2 | (3-7-1) | 7% |
| 3-HHB(2F,3Cl)-O2 | (3-8-1) | 5% |
| 3-HH1OB(2F,3F)-O2 | (3-12-1) | 5% |

NI = 75.8° C.;
Tc ≦ −20° C.;
Δn = 0.128;
Δε = −2.8;
η = 19.2 mPa·s

Example 10

| | | |
|---|---|---|
| 3-HHO2OB(2F,3F)-O2 | (1-2-1) | 8% |
| 5-HHO2OB(2F,3F)-O2 | (1-2-1) | 8% |
| 3-HH-4 | (2-1-1) | 5% |
| 3-HH-V | (2-1-1) | 5% |
| V2-BB-1 | (2-1-3) | 12% |
| 1V2-BB-1 | (2-1-3) | 10% |
| V-HHB-1 | (2-2-1) | 4% |
| 2-BB(3F)B-3 | (2-2-3) | 6% |
| V2-BB(3F)B-1 | (2-2-3) | 6% |
| V-HB(2F,3F)-O2 | (3-1-1) | 3% |
| 5-HB(2F,3Cl)-O2 | (3-2-1) | 3% |
| V-HHB(2F,3F)-O2 | (3-7-1) | 5% |
| V2-HHB(2F,3F)-O2 | (3-7-1) | 5% |
| 5-HHB(2F,3Cl)-O2 | (3-8-1) | 5% |
| 3-HBB(2F,3F)-O2 | (3-9-1) | 5% |
| 3-HH1OB(2F,3F)-O2 | (3-12-1) | 5% |

NI = 75.6° C.;
Tc ≦ −20° C.;
Δn = 0.127;
Δε = −2.9;
η = 19.5 mPa·s

What is claimed is:

1. A liquid crystal composition having a negative dielectric anisotropy comprising two components, wherein the first component is at least one compound selected from the group consisting of compounds represented by formulas (1-1) and (1-2), and the second component is at least one compound selected from the group consisting of compounds represented by formulas (2-1) to (2-3):

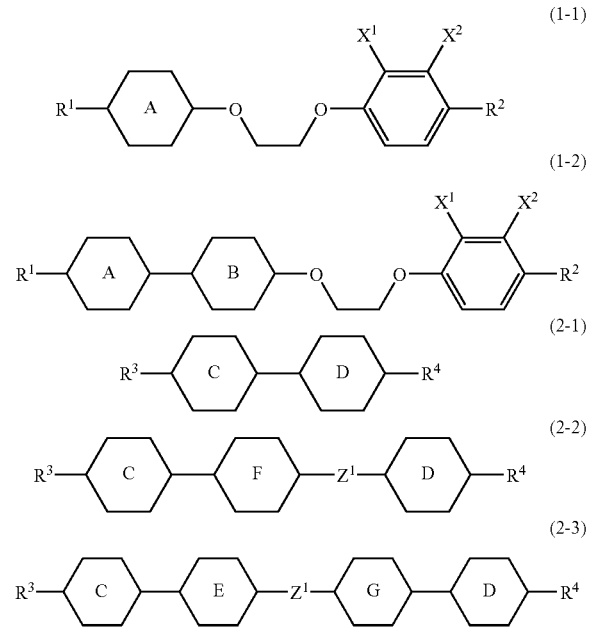

wherein $R^1$ and $R^2$ are each independently alkyl having 1 to 12 carbons, alkoxy having 1 to 12 carbons or alkenyl having 2 to 12 carbons; $R^3$ and $R^4$ are each independently alkyl having 1 to 12 carbons or alkenyl having 2 to 12 carbons, provided that in the alkyl and the alkenyl, arbitrary hydrogen may be replaced by fluorine, and arbitrary —$CH_2$— may be replaced by —O—; $X^1$ and $X^2$ are each independently fluorine or chlorine; ring A, ring B, ring C and ring D are each independently 1,4-cyclohexylene or 1,4-phenylene; ring E and ring G are each independently 1,4-cyclohexylene, 1,4-phenylene, 2-fluoro-1,4-phenylene or 3-fluoro-1,4-phenylene; ring F is 1,4-cyclohexylene, 1,4-phenylene, 2-fluoro-1,4-phenylene, 3-fluoro-1,4-phenylene or 2,5-difluoro-1,4-phenylene; and $Z^1$ is a single bond or carbonyloxy.

2. The liquid crystal composition of claim 1, wherein the first component is a mixture of at least one compound selected from the group consisting of compounds represented by formula (1-1) and at least one compound selected from the group consisting of compounds represented by formula (1-2), and the second component is at least one compound selected from the group consisting of compounds represented by formula (2-1).

3. The liquid crystal composition of claim 1, wherein the second component is a mixture of at least one compound selected from the group consisting of compounds represented by formula (2-1) and at least one compound selected from the group consisting of compounds represented by formula (2-2).

4. The liquid crystal composition of claim 1, wherein the second component is a mixture of at least one compound selected from the group consisting of compounds represented by formula (2-1) and at least one compound selected from the group consisting of compounds represented by formula (2-3).

5. The liquid crystal composition of claim 1, wherein the second component is a mixture of at least one compound selected from the group consisting of compounds represented by formula (2-2) and at least one compound selected from the group consisting of compounds represented by formula (2-3).

6. The liquid crystal composition of claim 1, wherein a ratio of the first component is from approximately 5% by weight to approximately 50% by weight, and a ratio of the second component is from approximately 35% by weight to approximately 70% by weight, based on the total weight of the liquid crystal composition.

7. The liquid crystal composition of claim 1, wherein the composition further comprises at least one compound selected from the group consisting of compounds represented by formula (3) as a third component:

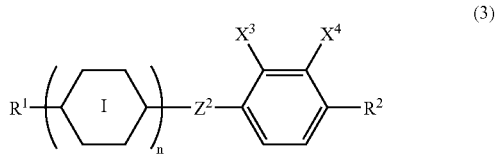

wherein $R^1$ and $R^2$ are each independently alkyl having 1 to 12 carbons, alkoxy having 1 to 12 carbons or alkenyl having 2 to 12 carbons; ring I is independently 1,4-cyclohexylene or 1,4-phenylene; $Z^2$ is a single bond, ethylene, carbonyloxy or methyleneoxy; $X^3$ and $X^4$ are each independently fluorine or chlorine; and n is 1 or 2.

8. The liquid crystal composition of claim 7, wherein the third component is at least one compound selected from the group consisting of compounds represented by formulas (3-1) to (3-12):

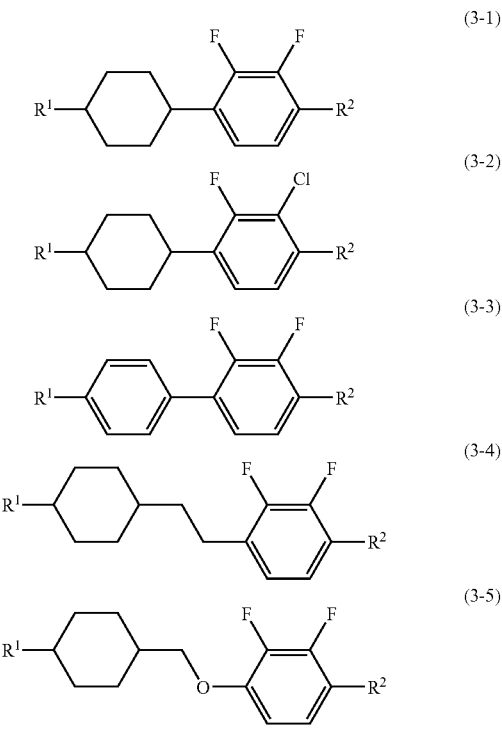

-continued

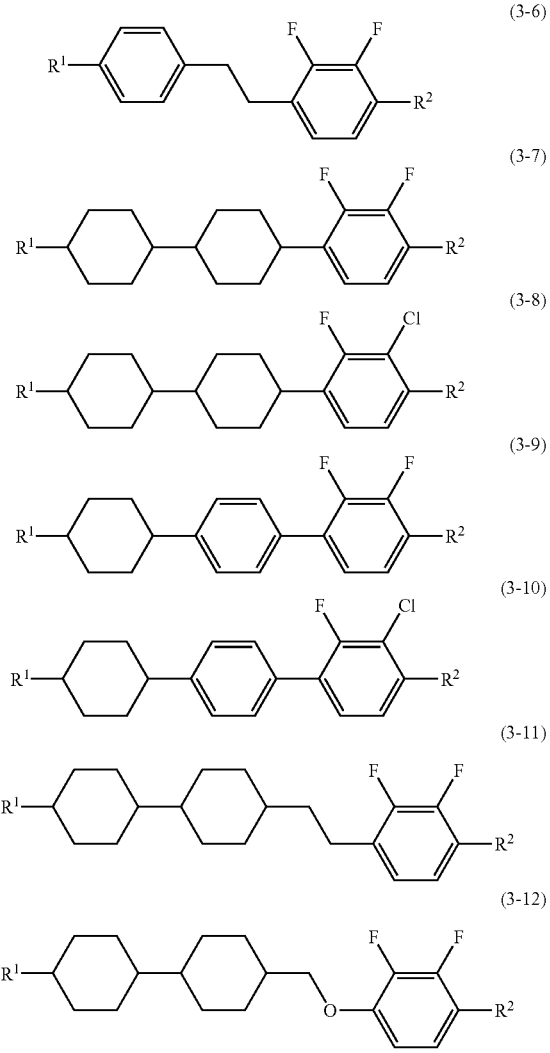

wherein $R^1$ and $R^2$ are each independently alkyl having 1 to 12 carbons, alkoxy having 1 to 12 carbons or alkenyl having 2 to 12 carbons.

9. The liquid crystal composition of claim 7, wherein the third component is a mixture of at least one compound selected from the group consisting of compounds represented by formula (3-1) and at least one compound selected from the group consisting of compounds represented by formula (3-7).

10. The liquid crystal composition of claim 7, wherein the third component is a mixture of at least one compound selected from the group consisting of compounds represented by formula (3-1) and at least one compound selected from the group consisting of compounds represented by formula (3-9).

11. The liquid crystal composition of claim 7, wherein the third component is a mixture of at least one compound selected from the group consisting of compounds represented by formula (3-4) and at least one compound selected from the group consisting of compounds represented by formula (3-9).

12. The liquid crystal composition of claim 7, wherein a ratio of the first component is from approximately 5% by weight to approximately 50% by weight, a ratio of the second component is from approximately 35% by weight to approximately 70% by weight, and a ratio of the third component is from approximately 5% by weight to approximately 40% by weight, based on the total weight of the liquid crystal composition.

13. The liquid crystal composition of claim 1, wherein the composition has a maximum temperature of a nematic phase of approximately 70° C. or more, an optical anisotropy (25° C.) at a wavelength of 589 nm of approximately 0.08 or more, and a dielectric anisotropy (25° C.) at a frequency of 1 kHz of approximately −2 or less.

14. A liquid crystal display device that includes the liquid crystal composition of claim 1.

15. The liquid crystal display device of claim 14, wherein the liquid crystal display device has an operation mode of a VA mode or an IPS mode, and has a driving mode of an active matrix mode.

16. The liquid crystal display device of claim 14, wherein the liquid crystal display device has an operation mode of a PSA mode, and has a driving mode of an active matrix mode.

* * * * *